F. MEDART, DEC'D.
E. J. MEDART, EXECUTOR.
CASTER FOR GYMNASIUM APPARATUS.
APPLICATION FILED FEB. 4, 1907.
940,606.
Patented Nov. 16, 1909.
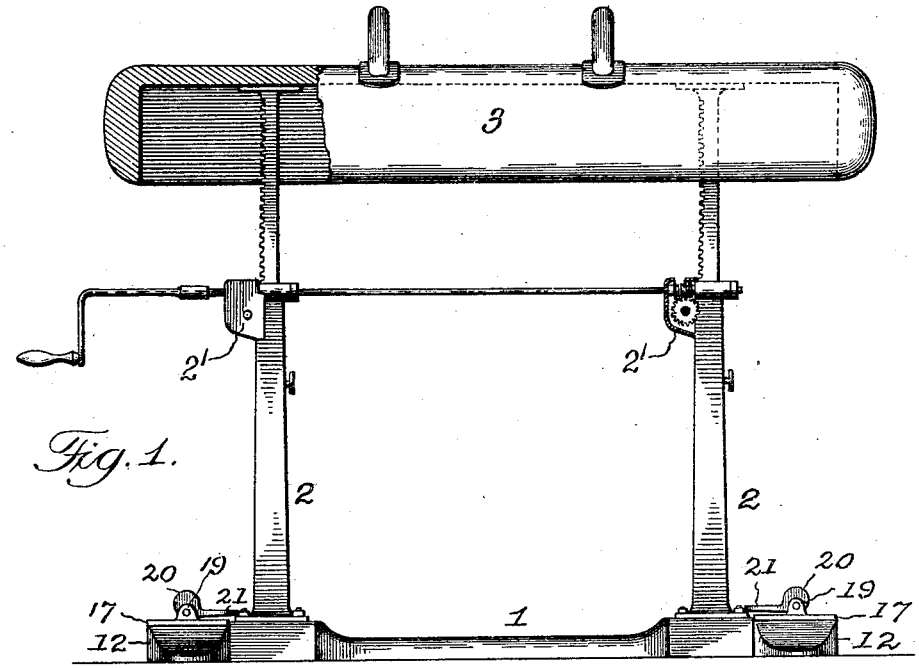

UNITED STATES PATENT OFFICE.

FREDERICK MEDART, OF ST. LOUIS, MISSOURI; EDWARD J. MEDART, EXECUTOR OF SAID FREDERICK MEDART, DECEASED, ASSIGNOR TO FRED MEDART MANUFACTURING COMPANY, OF ST. LOUIS, MISSOURI, A CORPORATION OF MISSOURI.

CASTER FOR GYMNASIUM APPARATUS.

940,606. Specification of Letters Patent. Patented Nov. 16, 1909.

Application filed February 4, 1907. Serial No. 355,544.

*To all whom it may concern:*

Be it known that I, FREDERICK MEDART, a citizen of the United States of America, and a resident of the city of St. Louis, in the State of Missouri, have invented certain new and useful Improvements in Casters for Gymnasium Apparatus, of which the following is a specification.

This invention relates to a caster attachment for gymnasium apparatus, such as vaulting horses, and which require to be occasionally moved from place to place on the gymnasium floor. And the present improvement has for its object to provide a simple and efficient structural arrangement and combination of parts by means of which the apparatus can be conveniently moved from place to place upon a gymnasium floor, and with which a firm and stable rest is given the apparatus when the present caster attachment is in its dormant condition, all as will hereinafter more fully appear.

In the accompanying drawings:—Figure 1, is a side elevation partly in section, illustrating the general arrangement of the present invention as applied to a vaulting horse. Fig. 2, is an enlarged detail longitudinal section of the supporting base, illustrating the present caster mechanism. Fig. 3, is a detail plan view of the same, the post of the apparatus being omitted as well as the cam levers which lower the casters.

Similar numerals of reference indicate like parts in the different views.

Referring to the drawings, 1 represents the base of a substantially H form; 2 the posts or uprights preferably of the adjustable form shown; and 3 the body of the horse or like member of a gymnasium apparatus, and of any usual construction.

12, are central caster housings arranged at the respective ends of the base 1 of the apparatus, and adapted to house the vertically adjustable casters and the means by which they are guided in their vertical adjustment, as hereinafter more fully described.

13, are the casters of any usual construction, and which are secured to horizontal plates 14 arranged in vertical containing recesses formed in the caster housing 12 aforesaid; the vertical walls 15 of said recesses acting as guides for the plates 14, while the lower ends of said walls are inturned to form stops 16 to limit the downward adjusting movement of said plates.

17 are removable cover plates for the containing recesses aforesaid; said plates are provided with apertures 18 and pivot ears 19 for the passage of and pivotal support of the operating cam levers now to be described.

20 are the cam levers, arranged in pairs, each formed with an eccentric body portion and an angularly extending operating arm 21. Said cam levers are pivotal between the pivot ears 19 aforesaid, and extend down through the apertures 18 to have bearing upon the caster carrying plates 14, as illustrated in Figs. 2 and 3. In one position said cam levers are adapted to move the caster carrying plates downward with relation to the base, to support the apparatus upon the casters, as illustrated in Fig. 2, in the operation of moving the apparatus from one place to another; while in their other position said cam levers permit the casters and caster carrying plates to ascend within the caster housing of the base, leaving said base resting solidly upon the floor. With the described central arrangement of the casters, the transverse extensions of the base 1 are adapted to afford trailing support to the apparatus when moved from place to place, and prevent the apparatus from tipping over.

Having thus fully described my said invention what I claim as new and desire to secure by Letters Patent is:—

1. The combination of a supporting base having transverse extensions at each end, casters arranged at the mid-length of said extensions and comprising caster carrying plates moving vertically in containing recesses formed therefor in the transverse extensions aforesaid, casters carried by said plates, and means for imparting vertical adjustment to said plates, substantially as set forth.

2. The combination of a supporting base having transverse extensions at each end, casters arranged at the mid-length of said extensions and comprising caster carrying plates moving vertically in containing recesses formed therefor in the transverse extensions aforesaid, casters carried by said plates, and means for imparting vertical adjustment to said plates, the same comprising operating cam levers having eccentric body portions and angularly extending operating arms, substantially as set forth.

3. The combination of a supporting base having transverse extensions at each end, casters arranged at the mid-length of said extensions and comprising caster carrying plates moving vertically in containing recesses formed therefor in the transverse extensions aforesaid, said recesses having vertical walls inturned at their lower ends to form stops, casters carried by said plates and means for imparting vertical adjustment to said plates, substantially as set forth.

4. The combination of a supporting base having transverse extensions at each end, casters arranged at the mid-length of said extensions and comprising caster carrying plates moving vertically in containing recesses formed therefor in the transverse extensions aforesaid, said recesses having vertical walls inturned at their lower ends to form stops, casters carried by said plates, and means for imparting vertical adjustment to said plates, the same comprising cover plates arranged at the top of the containing recesses aforesaid, cam levers pivoted to said cover plates and having eccentric body portions bearing against the caster carrying plates and operating arms, substantially as set forth.

Signed at St. Louis, Missouri, this 30th day of January 1907.

FREDERICK MEDART.

Witnesses:
WILLIAM WINTER,
LOUIS MENADIER.